No. 707,324. Patented Aug. 19, 1902.
W. H. H. HEYDRICK.
LAWN MOWER.
(Application filed Apr. 30, 1901.)
(No Model.)
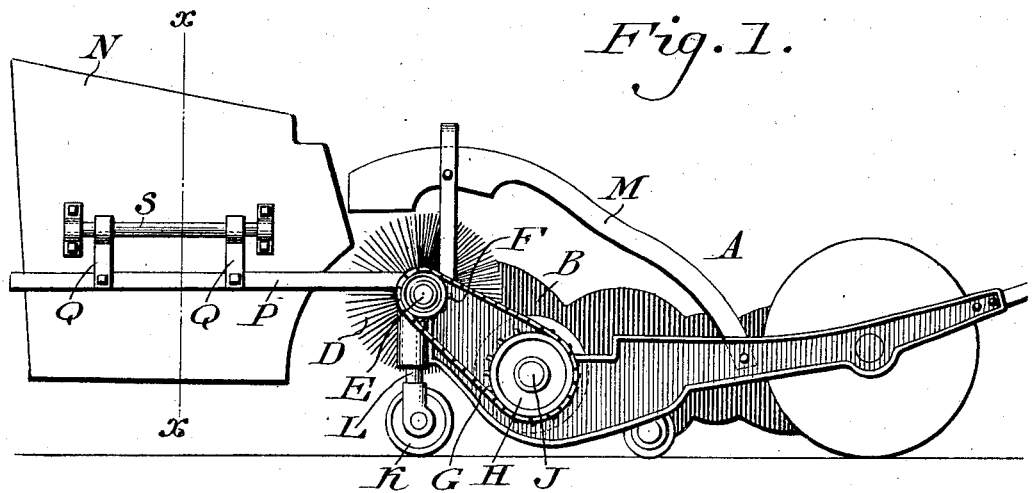
Fig. 1.
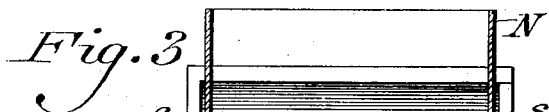
Fig. 3.
Fig. 2.
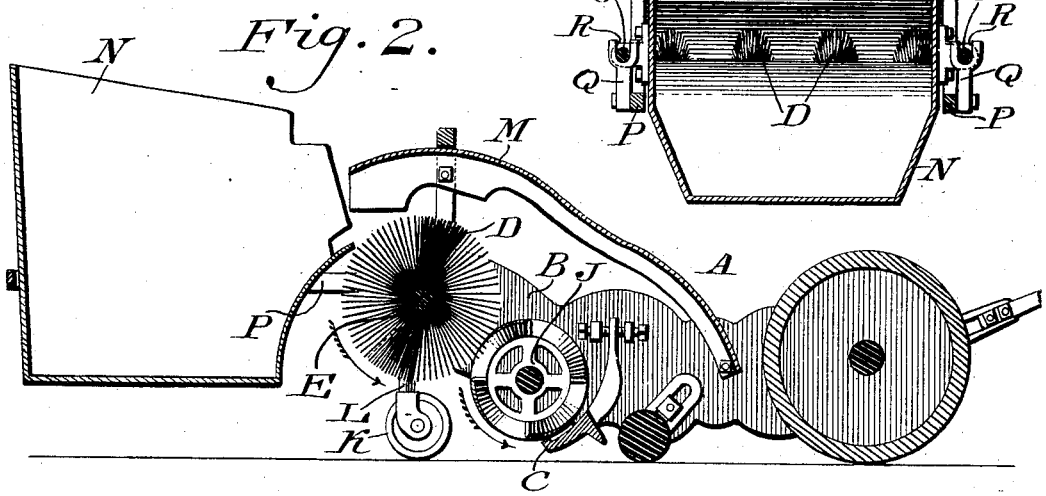
Witnesses
Inventor
William H. H. Heydrick.
By Wellersheim & Fairbanks.
Attorneys
THE NORRIS PETERS CO., PHOTO-LITHO., WASHINGTON, D. C.

UNITED STATES PATENT OFFICE.

WILLIAM H. H. HEYDRICK, OF PHILADELPHIA, PENNSYLVANIA.

LAWN-MOWER.

SPECIFICATION forming part of Letters Patent No. 707,324, dated August 19, 1902.

Application filed April 30, 1901. Serial No. 58,135. (No model.)

*To all whom it may concern:*

Be it known that I, WILLIAM H. H. HEYDRICK, a citizen of the United States, residing in the city and county of Philadelphia, State of Pennsylvania, have invented a new and useful Improvement in Lawn-Mowers, of which the following is a specification.

My invention consists of an improved construction of an attachment for lawn-mowers embodying a rotary brush or sweeper which is located in advance of the cutting mechanism and is adapted to break down or deflect grass, weeds, and the like toward said cutting mechanism which would ordinarily interfere with the action of said cutting mechanism or dull the same.

It also consists of the novel combination of a rotary wire brush with a guard thereover and a receptacle for receiving the cut grass and novel means for supporting said receptacle.

It further consists of novel details of construction, all as will be hereinafter fully set forth, and particularly pointed out in the claims.

Figure 1 represents a side elevation of an attachment for lawn-mowers embodying my invention. Fig. 2 represents a longitudinal section of Fig. 1. Fig. 3 represents a section on line $x$ $x$, Fig. 1.

Similar letters of reference indicate corresponding parts in the figures.

Referring to the drawings, A designates a lawn-mower having the framework B, wherein is supported the cutting mechanism C and its adjuncts, which may be of the usual construction.

D designates a rotary brush or sweeper which is mounted in the frame B in advance of the cutting mechanism and at such height with respect thereto that said brush will tend to break down and deflect any grass or weeds in its path, so that the same can be readily acted on by the cutting device.

E designates a shaft rotatably supported which has the sprocket-wheel F attached thereto, around which passes the chain G, which is actuated by means of the wheel H, mounted on the shaft J, which carries the cutting mechanism C.

K designates rollers which are located in advance of the cutting mechanism and below the brush D, said rollers being supported from posts L, attached to the frame B.

M designates a guard mounted over the cutting mechanism C and brush D, said guard being adapted to deflect the cuttings into the receptacle N, which latter is supported on the brackets Q on the arms P, which latter project forward of the framework B, said brackets having the recesses R, wherein are seated the handles or rods S, whereby the receptacle N can be readily raised or disengaged and emptied of its contents according to requirements.

It will be noted that as the grass has left the cutting mechanism it is thrown upward toward the guard M and onto the top of the brush D, which is revolving in the direction indicated by the arrow in Fig. 2, which thus sweeps the same into the receptacle N. By this construction and arrangement the brush D serves the double purpose of guiding the grass or weeds to the cutting mechanism and then after the same has been cut of taking the cut grass or weeds and discharging them into the receptacle.

It will be apparent that changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. In a lawn-mower a cutting mechanism a sweeper located in advance of said cutting mechanism and elevated to be out of contact with the ground, a receptacle in advance of said sweeper and means for revolving said sweeper which latter is adapted to deflect the weeds, &c., to the cutting mechanism and receive the cut weeds, &c., and discharge the same into said receptacle.

2. In a lawn-mower, a frame, a shaft mounted therein, a cutting mechanism carried by said shaft, a brush disposed above the point of action of the cutting mechanism to deflect the grass, &c., thereto a receptacle in advance of the cutting mechanism a brush-actuating mechanism connected with said shaft means connected with said actuating mechanism for rotating said brush and rollers located under the brush and supported from said frame.

3. In a lawn-mower, a cutting mechanism, a receptacle located in advance of the said cutting mechanism, a sweeper located intermediate of said cutting mechanism and receptacle, and means for rotating said sweeper which latter is adapted to deflect the weeds and the like to said cutting mechanism and to receive the cut weeds and the like from said cutting mechanism and discharge the same into said receptacle.

4. The combination in a lawn-mower, of a framework, cutting mechanism mounted therein, a brush rotatably mounted in advance of said cutting mechanism, rollers located under said brush for supporting the same, a hood located over said cutting mechanism and brush, arms projecting forwardly from said framework and a receptacle for the cut grass mounted on said arms.

5. In a lawn-mower, a cutting mechanism, a receptacle in advance of said cutting mechanism a sweeper intermediate of said cutting mechanism and said receptacle, means for rotating said sweeper, and a guard located over said cutting mechanism and said sweeper to deflect the cut grass into said receptacle.

6. In a lawn-mower, cutting mechanism, a sweeper located in advance thereof, a receptacle in advance of the cutting mechanism and extending above the same and a guard located over said cutting mechanism and said sweeper.

7. In a lawn-mower, a cutting mechanism, a receptacle in advance of said cutting mechanism and a brush located between said cutting mechanism and said receptacle which is adapted to be rotated and which depresses the grass and the like to the cutting mechanism and is adapted to convey the cut grass and the like from the cutting mechanism to the receptacle.

8. In a lawn-mower, a cutting mechanism, a receptacle in advance of said cutting mechanism, a brush located between said cutting mechanism and said receptacle, and constructed and arranged to depress the grass and guide it to the cutting mechanism and to assist in throwing the cut grass into said receptacle, and a hood extending over said cutting mechanism and said brush.

WILLIAM H. H. HEYDRICK.

Witnesses:
JOHN A. WIEDERSHEIM,
C. D. McVAY.